United States Patent [19]

Waku et al.

[11] Patent Number: 5,733,235
[45] Date of Patent: Mar. 31, 1998

[54] RUBBER COVERED ROLL, RUBBER COMPOSITION, AND IMAGE-FORMING APPARATUS

[75] Inventors: Tetsuo Waku; Hiromitsu Kikuchi; Takeshi Ooishi, all of Kawasaki; Michiharu Yogosawa, Shizuoka-ken, all of Japan

[73] Assignee: Nippon Zeon Co., Ltd., Tokyo, Japan

[21] Appl. No.: 561,606

[22] Filed: Nov. 21, 1995

[30] Foreign Application Priority Data

Nov. 22, 1994 [JP] Japan .................. 6-312706
Nov. 7, 1995 [JP] Japan .................. 7-313650

[51] Int. Cl.$^6$ .................. G03G 15/06; B44F 1/10; B32B 25/04; C08L 71/02
[52] U.S. Cl. .................. 492/25; 399/147; 399/154; 399/176; 428/29; 428/492; 492/56; 492/59
[58] Field of Search .................. 355/259, 211, 355/219; 428/29, 492; 525/187, 523, 535, 539; 492/25, 56, 59; 399/147, 154, 176

[56] References Cited

U.S. PATENT DOCUMENTS

| | | | |
|---|---|---|---|
| 4,530,994 | 7/1985 | Shimizu et al. | 525/403 |
| 4,591,617 | 5/1986 | Berta | 525/187 |
| 4,689,377 | 8/1987 | Aonuma et al. | 525/523 |
| 4,898,689 | 2/1990 | Hamada et al. | 252/510 |
| 4,910,556 | 3/1990 | Namiki | 355/245 |
| 4,931,506 | 6/1990 | Yu | 525/187 |
| 5,241,343 | 8/1993 | Nishio | 355/219 |
| 5,556,916 | 9/1996 | Matoba et al. | 525/64 |

FOREIGN PATENT DOCUMENTS

| | | |
|---|---|---|
| 88-150595/22 | 4/1988 | Japan . |
| 63-251464 | 10/1988 | Japan . |
| 1-219775 | 9/1989 | Japan . |
| 89-351454/48 | 10/1989 | Japan . |
| 2-241578 | 9/1990 | Japan . |
| 2-55769 | 10/1990 | Japan . |
| 2-311781 | 12/1990 | Japan . |
| 95-260580/34 | 6/1995 | Japan . |
| 233520 | 8/1987 | United Kingdom . |
| 543669 | 5/1993 | United Kingdom . |
| 606907 | 7/1994 | United Kingdom . |

*Primary Examiner*—H. Thi Le
*Attorney, Agent, or Firm*—Dinsmore & Shohl LLP

[57] ABSTRACT

A rubber covered roll of a structure that a rubber layer is formed on the surface of a roll-like base is provided. The rubber layer is a layer formed of a vulcanizate of a rubber composition comprising 25–95 wt. % of copolymer rubber (A) obtained by copolymerizing 28–70 mol % of an alkylene oxide, 28–70 mol % of an epihalohydrin and 2–15 mol % of an ethylenically unsaturated epoxide, and 5–75 wt. % of unsaturated rubber (B). The rubber covered roll does not contaminate any photosensitive member, stably has a low electric resistance, and is low in dependence of electric resistance on environment and in hardness. An image-forming apparatus equipped with the rubber covered roll as a development roll or charging roll, and a rubber composition for the rubber covered roll are also provided.

18 Claims, 1 Drawing Sheet

RUBBER COVERED ROLL, RUBBER COMPOSITION, AND IMAGE-FORMING APPARATUS

FIELD OF THE INVENTION

The present invention relates to a rubber covered roll, and more particularly to a rubber covered roll suitable for use as a development roll or charging roll which is arranged in contact with a photosensitive member (also referred to as an image-bearing member or photosensitive drum) in an image-forming apparatus such as an electrophotographic copying or printing machine. This invention also relates to an image-forming apparatus equipped with such a rubber covered roll and a rubber composition suitable for use in forming a rubber layer for the rubber covered roll.

BACKGROUND OF THE INVENTION

As dry development processes in an electrophotographic development system, there have been generally known two-component development processes making use of a two-component developer composed of a carrier and a toner (developer) mixed with each other, and one-component development processes making use of a magnetic or non-magnetic one-component developer.

The two-component development processes require a large and complicated image-forming apparatus and moreover to control the mixing ratio of the carrier to the toner. For this reason, the one-component development processes having no need of the carrier are adopted in recent small-sized copying machines and printers. Of the one-component development processes, a non-magnetic one-component development process, which makes no use of a magnet in an image-forming apparatus, permits the miniaturization and reduction in cost of the image-forming apparatus, formation of color images, and the like. Therefore, in recent years, many improvements have been proposed in this technical field.

In an image-forming apparatus such as an electrophotographic copying machine, an image is generally formed through steps of charging, exposure, development, transfer, fixing and cleaning. More specifically, in the image-forming apparatus, the image is formed through the charging step of equally and uniformly charging a photosensitive member with electricity, the exposure step of forming an electrostatic latent image on the photosensitive member by exposure, the development step of developing the electrostatic latent image into a visible image with a developer (toner), the transfer step of transferring the toner on the photosensitive member to a transfer material, the fixing step of fixing the toner on the transfer material and the cleaning step of cleaning off the toner remaining on the photosensitive member after the transfer step.

Figure 1:
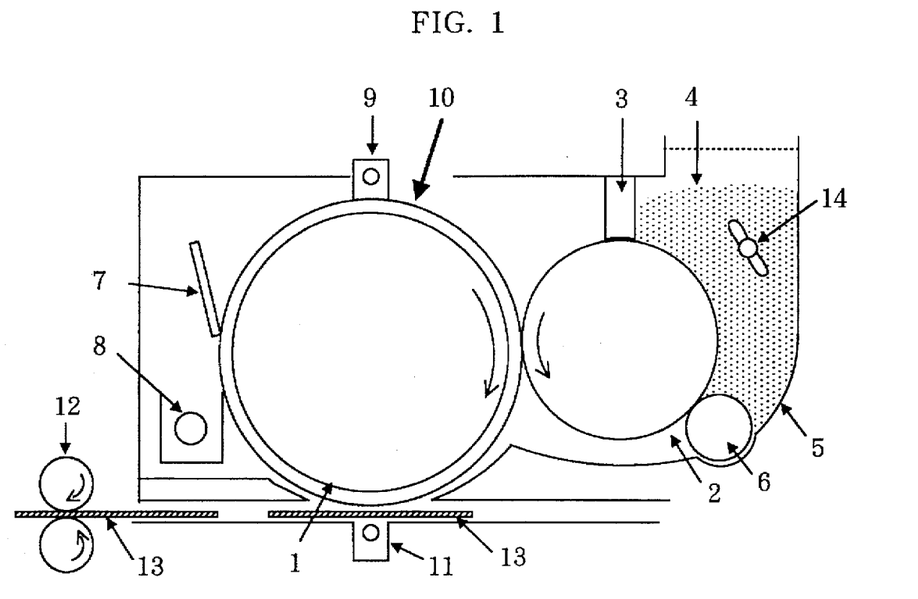
FIG. 1 is a cross-sectional view illustrating one embodiment of an image-forming apparatus used in the present invention.

As image-forming apparatus used in the non-magnetic one-component development process, there have been known, for example, those of a structure as illustrated in FIG. 1. A photosensitive member 1, on which an electrostatic latent image is formed, and a development roll 2 are arranged so as to come into contact with each other. A non-magnetic one-component developer (toner) 4 is fed by the development roll 2 to develop the latent image formed on the photosensitive member 1 into a visible image. A developer feed roll 6 is arranged adjoiningly to the development roll 2 on the side of a developer container 5. The feed roll 6 rotates in the same direction as the development roll 2 to coat the surface of the development roll 2 with the toner 4 stored in the developer container 5. A layer-thickness regulator for the developer adapted to control the layer thickness of the developer, such as a development blade 3 is arranged so as to bring its free edge into contact under pressure with the surface of the development roll 2, whereby the toner is coated on the development roll 2 as a thin layer of a uniform thickness.

As such an image-forming apparatus having a structure that the photosensitive member and the development roll come into contact with each other, apparatus of varied types have been developed. In recent years, apparatus of a cartridge type have come to be widely used. Among toner cartridges, there is a cartridge of a type that a development roll, a development blade and a feed roll are incorporated therein.

Figure 2:
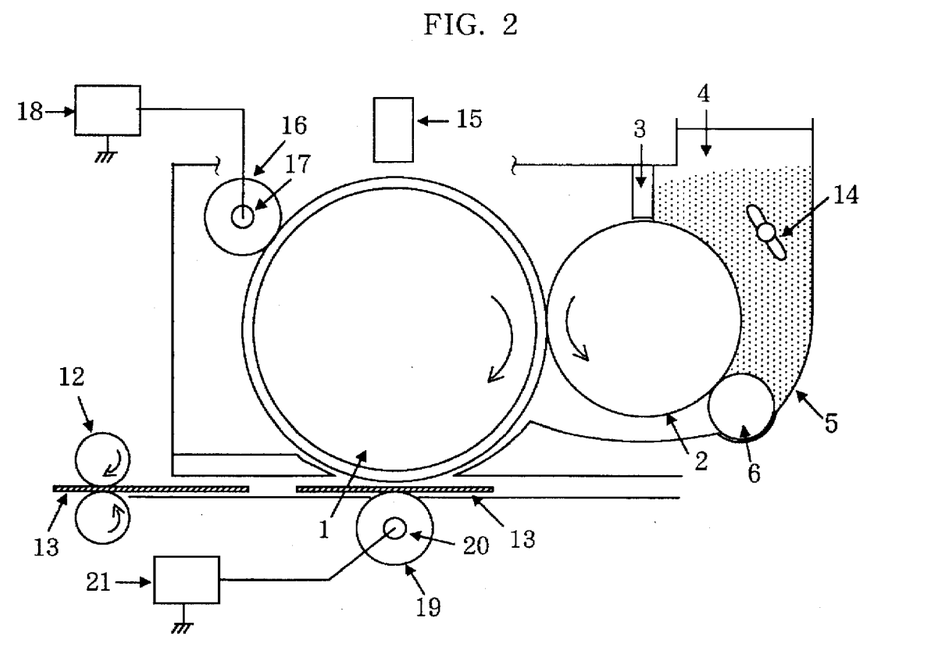
FIG. 2 is a cross-sectional view illustrating another embodiment of an image-forming apparatus used in the present invention.

Among the image-forming apparatus of varied types, attention has been paid to a system that a photosensitive member is charged with a charging roll. In the charging step of the photosensitive member, electrification has heretofore been generally performed by corona discharge. However, the electrification system by the corona discharge has involved a problem that harmful substances such as ozone are generated, in addition to a risk due to the application of high voltage and increased cost. On the other hand, in an electrification system making use of the charging roll, as illustrated in FIG. 2, a charging roll 16, to which voltage has been applied, is brought into contact with a photosensitive member 1 to directly give an electric charge to the photosensitive member, thereby charging the photosensitive member with electricity. According to this electrification system, the possibility of generating ozone is eliminated. In the transfer step, it has also been proposed to use a transfer roll 19 and apply voltage having a polarity opposite to the toner to the transfer roll so as to generate an electric field, whereby the toner on the photosensitive member is transferred to a transfer material by the electrostatic force of the electric field.

After the transfer step, the toner remaining on the photosensitive member is generally removed by a cleaning device such as a cleaning blade 7 as illustrated in FIG. 1. On the other hand, as illustrated in FIG. 2, there has recently been proposed a cleanerless system (cleaningless process) in which the cleaning step is omitted. In this system, the toner remaining on the photosensitive member is attracted to a development device by electrostatic force generated by a difference between the surface potential of the photosensitive member charged and a developing bias to recover it. As the development device, is used a device of a structure that the development roll 2 comes into contact with the photosensitive member 1. Namely, the bias voltage is applied to the development roll 2 through its core bar, thereby conducting recovery (cleaning-off) of the remaining toner at the same time as the development.

In such an image-forming apparatus having the structure that the photosensitive member comes into contact with the development roll, a rubber covered roll of a structure that a rubber layer is formed on the surface of a roll-like base (a metallic shaft or the like) is used as the development roll. In the image-forming apparatus making use of the charging roll, a rubber covered roll is also used as the charging roll. In such an image-forming apparatus, the photosensitive member always comes into contact with the rubber covered roll. Therefore, it is necessary to prevent the photosensitive member from being contaminated with the rubber covered roll. In particular, with the miniaturization of the apparatus, an organic photoconductive photosensitive member (hereinafter referred to as "OPC photosensitive member", which is easy to be contaminated, has come to be used. Accordingly, the prevention of the contamination is an important problem.

By the way, it is necessary to make the contact area of the development roll with the photosensitive member larger in order to keep the developability high. In order to impart good charging characteristics to the photosensitive member, it is necessary to make the contact area of the charging roll with the photosensitive member larger. In order to make the contact area larger, it is necessary to lower the hardness of these rubber covered rolls. In order to apply necessary bias voltage to these rubber covered rolls, it is also necessary to lower the electric resistance of the rubber covered rolls. In addition, the rubber covered rolls are required to be low in dependence of electric resistance on environment and to stably have a low electric resistance. These rubber covered rolls undergo deformation due to the contact with the photosensitive member. However, they must avoid being permanently deformed by this deformation. As described above, the rubber covered rolls used in contact with the photosensitive member, such as the development roll and the charging roll are required to have many properties and/or characteristics.

In order to meet these requirements for the development roll, various researches and proposals have heretofore been made. For example, it has been proposed to form a rubber layer with a rubber composition in which silicone rubber having a high electric resistance is compounded with particles of a conductive silicone rubber, so as to lower the electric resistance of a roll at its surface (Japanese Patent Application Laid-Open No. 251464/1988). It has also been proposed to use a rubber composition in which a silicone rubber is compounded with carbon black treated with a surfactant (Japanese Patent Application Laid-Open No. 255769/1990). It is possible to lower the hardness of the rubber layer by using the silicone rubber. However, it is difficult to sufficiently lower the electric resistance thereof.

It is said that a copolymer rubber composed of propylene oxide (if ethylene oxide is used in combination, it is used in an amount not greater than that of propylene oxide), epichlorohydrin and an ethylenically unsaturated epoxide (Japanese Patent Application Laid-Open No. 219775), a copolymer rubber composed of propylene oxide and epichlorohydrin (Japanese Patent Application Laid-Open No. 241578/1989) and the like are rubbers low in electric resistance and hardness. However, such properties of these rubbers do not reach the levels required of the rubber covered rolls such as the development roll and charging roll. The problem of contaminating the photosensitive member is also not solved.

Recently, there has been proposed a development roll obtained by laminating a first layer formed of a composition, in which a mixture of polynorbornene and an ethylene-propylene copolymer is compounded with oil and carbon black, a second layer formed of a copolymer rubber of ethylene oxide and epichlorohydrin, and a third layer formed of an N-methoxymethylated nylon resin on one another (Japanese Patent Application Laid-Open No. 311871/1990). However, such a laminate structure is complicated in its production process. In addition, in the process of lowering the electric resistance by compounding a large amount of conductive particles such as carbon black, the dispersion state of the conductive particles is subject to variations according to their kneading conditions. Therefore, such a process has involved a problem that the electric resistance of the roll is variable. The compounding of the conductive particles in plenty makes the surface hardness of the rubber covered roll too high.

OBJECTS AND SUMMARY OF THE INVENTION

It is an object of the present invention to provide a rubber covered roll which does not contaminate any photosensitive member, is low in dependence of electric resistance on environment, stably has a low electric resistance and hardness.

More specifically, the object of the present invention is to provide a rubber covered roll suitable for use as a development roll or charging roll which is arranged in contact with a photosensitive member in an image-forming apparatus in which an electrostatic latent image on the photosensitive member is developed into a visible image with a developer.

Another object of the present invention is to provide a rubber composition for rubber covered rolls suitable for use in forming a surface layer for such a rubber covered roll.

A further object of the present invention is to provide an image-forming apparatus equipped with a rubber covered roll having the properties as described above.

The present inventors have carried out an extensive investigation with a view toward overcoming the above-mentioned problems involved in the prior art. As a result, it has been found that the above objects can be achieved by a rubber covered roll in which a rubber layer is formed from vulcanized rubber obtained by vulcanizing a blended rubber of copolymer rubber composed of an alkylene oxide, an epihalohydrin and an ethylenically unsaturated epoxide, and unsaturated rubber. As a vulcanizing agent, a sulfur type vulcanizing agent or a peroxide is preferred because it shows good vulcanizability and does not contaminate any photosensitive member.

The present invention has been led to completion on the basis of these findings.

According to the present invention, there is thus provided a rubber covered roll of a structure that a rubber layer is formed on the surface of a roll-like base, characterized in that the rubber layer is a layer formed of a vulcanizate of a rubber composition comprising 25–95 wt. % of copolymer rubber (A) obtained by copolymerizing 28–70 mol % of an alkylene oxide, 28–70 mol % of an epihalohydrin and 2–15 mol % of an ethylenically unsaturated epoxide, and 5–75 wt. % of unsaturated rubber (B).

According to the present invention, there is also provided an image-forming apparatus of a structure that a photosensitive member and a development roll are arranged in contact with each other, and an electrostatic latent image formed on the photosensitive member is developed into a visible image with a non-magnetic one-component developer uniformly coated on the surface of the development roll, characterized in that the development roll is the rubber covered roll described above.

According to the present invention, there is further provided a rubber composition for rubber covered rolls, comprising 100 parts by weight of a rubber component containing 25–95 wt. % of copolymer rubber (A) obtained by copolymerizing 28–70 mol % of an alkylene oxide, 28–70 mol % of an epihalohydrin and 2–15 mol % of an ethylenically unsaturated epoxide, and 5–75 wt. % of unsaturated rubber (B), and 0.1–5 parts by weight of a vulcanizing agent consisting of a sulfur type vulcanizing agent or a peroxide.

DETAILED DESCRIPTION OF THE INVENTION

Features of the present invention will hereinafter be described in detail.

Copolymer rubber (A)

The copolymer rubber of the component (A) useful in the practice of the present invention is copolymer rubber obtained by copolymerizing 28–70 mol % of an alkylene oxide, 28–70 mol % of an epihalohydrin and 2–15 mol % of an ethylenically unsaturated epoxide; based on the total mol of the monomer.

Examples of the alkylene oxide include ethylene oxide, propylene oxide and butylene oxide. These alkylene oxides may be used either singly or in any combination thereof. If these alkylene oxides are used in combination with each other, ethylene oxide and propylene oxide may preferably be used in combination. In the case where ethylene oxide (EO) and propylene oxide (PO) are used in combination, both oxides are used in the molar ratio (EO:PO) of generally 10:90 to 90:10. The molar ratio of EO:PO may preferably be at least 1.

Any copolymerizing proportion of the alkylene oxide in the copolymer rubber (A) exceeding 70 mol % results in copolymer rubber high in hygroscopicity or high in dependence of electric resistance on environment. On the other hand, any proportion lower than 28 mol % results in copolymer rubber high in hardness. It is hence not preferable from the viewpoint of practical use to use the alkylene oxide in any proportion outside the above range. The copolymerizing proportion of the alkylene oxide may preferably be 32–65 mol %, more preferably 37–60 mol %.

Examples of the epihalohydrin include epichlorohydrin, epibromohydrin and epifluorohydrin. Of these, epichlorohydrin is particularly preferred from the viewpoint of its easy availability and the like.

Any copolymerizing proportion of the epihalohydrin in the copolymer rubber (A) exceeding 70 mol % results in copolymer rubber high in electric resistance. On the other hand, any proportion lower than 28 mol % results in copolymer rubber high in hygroscopicity or dependence of electric resistance on environment. It is hence not preferable from the viewpoint of practical use to use the epihalohydrin in any proportion outside the above range. The copolymerizing proportion of the epihalohydrin may preferably be 30–65 mol %, more preferably 35–60 mol %.

Examples of the ethylenically unsaturated epoxide include allyl glycidyl ether, glycidyl methacrylate, glycidyl acrylate and butadiene monoxide. The incorporation of the ethylenically unsaturated epoxide as a comonomer makes it possible to vulcanize the copolymer rubber with a sulfur type vulcanizing agent (sulfur or a sulfur donor) or a peroxide, resulting in copolymer rubber improved in deterioration by heat softening and dynamic ozone resistance. Any copolymerizing proportion of the ethylenically unsaturated epoxide in the copolymer rubber (A) exceeding 15 mol % results in copolymer rubber liable to undergo deterioration by heat curing to lose rubber elasticity, and hence become brittle. On the other hand, any proportion lower than 2 mol % results in copolymer rubber difficult to vulcanize. Besides, any copolymerizing proportion of the ethylenically unsaturated epoxide outside the above range fails to form a plain rubber sheet or makes it difficult to form the sheet. The copolymerizing proportion of the ethylenically unsaturated epoxide may preferably be 3–10 mol %.

Unsaturated rubber (B)

The unsaturated rubber of the component (B) useful in the practice of the present invention is rubber having unsaturated bonds in its molecule. The amount of the unsaturated bonds in the molecule is generally 3–500, preferably 5–350 in terms of the iodine value. Specific examples of such rubber include acrylonitrile-butadiene copolymer rubber (NBR), ethylene-propylene-diene terpolymer rubber (EPDM), chloroprene rubber (CR), acrylonitrile-isoprene copolymer rubber, acrylonitrile-butadiene-isoprene terpolymer rubber (NBIR), styrene-butadiene copolymer rubber (SBR), butadiene rubber (BR), isoprene rubber (IR) and partially hydrogenated products of these rubbers. NBR and the partially hydrogenated product of NBR (hydrogenated NBR) are particularly preferred. These unsaturated rubbers may be used either singly or in any combination thereof.

Vulcanizing agent (C)

In the present invention, it is preferable to use a sulfur type vulcanizing agent or a peroxide as a vulcanizing agent for vulcanizing the rubber component containing the copolymer rubber (A) and the unsaturated rubber (B). The peroxide is particularly preferred from the viewpoint of the prevention of contamination of a photosensitive member, image properties and the like. The use of these vulcanizing agents can prevent the photosensitive member from being contaminated with the rubber layer on the surface of the rubber covered roll, which the layer is formed of the vulcanized rubber.

As examples of the sulfur type vulcanizing agent, may be mentioned sulfur and sulfur donors which are generally used in vulcanization of diene rubbers. As examples of the sulfur donors, may be mentioned morpholine disulfide and thiuram compounds such as tetramethylthiuram disulfide. Examples of the peroxide include dicumyl peroxide, di-(t-butylperoxy) diisopropylbenzene, 2,5-di-t-butylperoxy-2,5-dimethylhexane and benzoyl peroxide.

In order to enhance the vulcanizing efficiency of the peroxide, a crosslinking aid may also be used. As the crosslinking aid, a maleimide compound is preferred. Specific example thereof include maleimide and phenylenebismaleimide. Acrylic or methacrylic polyfunctional monomers may also be used in addition to the maleimide compounds.

The use of vulcanizing agents other than the sulfur type vulcanizing agents and peroxides, for example, thiourea or amine compounds, as the vulcanizing agent makes it liable to contaminate the photosensitive member with the vulcanized rubber layer of the resulting rubber covered roll.

Rubber composition

The copolymer rubber (A) is used in a proportion of 25–95 wt. %, preferably 30–90 wt. %, more preferably 35–80 wt. % of the rubber component [(A)+(B)]. The unsaturated rubber (B) is used in a proportion of 5–75 wt. %, preferably 10–70 wt. %, more preferably 20–65 wt. % of the rubber component. The compounding of the unsaturated rubber (B) markedly improves the processability of the compounded rubber, for example, shortening of its kneading time to a great extent.

The sulfur type vulcanizing agent or peroxide used as the vulcanizing agent is used in a proportion of 0.1–5 parts by weight, preferably 0.2–3 parts by weight, more preferably 0.3–2 parts by weight per 100 parts by weight of the rubber component [(A)+(B)].

The rubber composition according to the present invention may be mixed with usual rubber compounding ingredients such as conductivity-imparting agents, reinforcing materials, fillers and antioxidants as needed. The rubber composition according to the present invention can be prepared by mixing all the components described above using a mixer routinely used, such as a roll mill or Banbury mixer.

Molding and surface treatment of rubber covered roll

In order to obtain a molded article of the desired form using the rubber composition according to the present invention, it is only necessary to fill the rubber composition into a mold or the like and generally heat the mold to 100°–250° C. to vulcanize the rubber composition. In order to molding a rubber covered roll, it is only necessary to place a roll-like base such as a metallic shaft as a core bar in a mold for a roll, fill the rubber composition into the mold so as to shape it to a roll around the core bar and then heat the mold to vulcanize the rubber composition.

After the vulcanization and molding, the resultant rubber covered roll may preferably be subjected to a surface treatment in order to lower the frictional resistance and tack of its surface. In order to conduct the surface treatment of the rubber covered roll, in general, its surface is suitably polished with an abrasive and then treated in the following manner.

Surface-treating methods of the rubber covered roll include ultraviolet-light irradiation, exposure to ozone, application of a reactive silicone compound, application of a reactive fluorine compound and the like. By such a surface treatment, the frictional resistance of the roll surface can be lowered to reduce the tack to the photosensitive member. As a result, the contamination of the photosensitive member can be prevented more effectively.

As an example of the surface treatment by the ultraviolet-light irradiation, may be mentioned a process in which a rubber covered roll to be treated is rotated around an ultraviolet lamp (wavelength: 200–450 nm) to exposure the roll to ultraviolet rays for 1–10 minutes. For example, a lamp having a lamp output of 80 W/cm and a rated power of 4,000 W may preferably be used as the ultraviolet lamp.

As an example of the surface treatment by the exposure to ozone, may be mentioned a process in which a rubber covered roll is left over for about 0.5–2 hours in an atmosphere containing ozone in a concentration of 10–30 pphm ($\times 10^{-8}$) at a temperature of 35°–45° C.

As an example of the surface treatment by the application of the reactive silicone compound, may be mentioned a process in which a silicone compound at the terminals of which an isocyanate has been introduced is used, the surface of a rubber covered roll is coated with a solution with this silicone compound dissolved in a concentration of about 1–10 wt. % in a solvent such as ethyl acetate, and the rubber covered roll is air-dried and then subjected to a heat treatment at about 80°–120° C. for about 30 minutes to 2 hours.

As an example of the surface treatment by the application of the reactive fluorine compound, may be mentioned a process in which a fluorine compound at the terminals of which an isocyanate has been introduced is used, the surface of a rubber covered roll is coated with a solution with this silicone compound dissolved in a concentration of about 1–10 wt. % in a solvent such as ethyl acetate, and the rubber covered roll is air-dried and then subjected to a heat treatment at about 80°–120° C. for about 30 minutes to 2 hours.

Of these surface treatments, the treatment by the ultraviolet-light irradiation is particularly preferred because the operation is simple.

The electric resistance (volume resistivity) of the rubber layer in the rubber covered roll according to the present invention is generally $1 \times 10^6$ to $1 \times 10^{11}$ Ω.cm, preferably $5 \times 10^6$ to $1 \times 10^{10}$ Ω.cm under LL conditions (10° C., 20% RH) of low temperature and low humidity. If this electric resistance is too low, electricity charged in the roll leaks out. On the other hand, if the electric resistance is too high, it is difficult for the developer (toner) to adhere to the roll. In both cases, the resulting visible images tend to become indistinct. The ratio (a/b) of an electric resistance (a) measured under the LL conditions to an electric resistance (b) measured under HH conditions (35° C., 80% RH) of high temperature and high humidity may preferably be within a range of 0.1–10.

The hygroscopicity of the rubber layer in the rubber covered roll according to the present invention is generally at most 0.7%, preferably at most 0.5% and often within a range of 0.1–0.5%.

The hardness (JIS K-6253) of the rubber layer in the rubber covered roll according to the present invention is generally 35–65 (type duro A), preferably 40–60 (type duro A), more preferably 40–55 (type duro A). If the hardness of the rubber layer is to high, its contact angle with the photosensitive member becomes small, and there is also a possibility that the photosensitive member may be damaged.

The rubber covered roll according to the present invention does not contaminate the photosensitive member even when used as a development roll or charging roll in contact with the photosensitive member in an image-forming apparatus, and so it can provide images showing excellent image properties.

Image-forming apparatus

The rubber covered roll according to the present invention is suitable for use as a development roll or charging roll arranged in contact with a photosensitive member in an image-forming apparatus in which an electrostatic latent image formed on the photosensitive member is developed into a visible image with a developer (toner).

As the image-forming apparatus, may be mentioned image-forming apparatus of the structure that a photosensitive member and a development roll are arranged in contact with each other, and an electrostatic latent image formed on the photosensitive member is developed into a visible image with a non-magnetic one-component developer uniformly coated on the surface of the development roll. Examples of such an image-forming apparatus include those illustrated in FIGS. 1 and 2.

In the image-forming apparatus illustrated in FIG. 1, a layer-thickness regulator for a developer adapted to control the layer thickness of the developer, such as a development blade 3 is arranged so as to bring its free edge into slide contact with the peripheral surface of a development roll 2. A developer feed roll 6 may be rotatably arranged adjoiningly to the development roll 2 so as to assist the development roll in causing the toner to well adhere to the peripheral surface of the development roll 2. By the action of the feed roll 6 and the development blade 3, the toner is coated on the development roll 2 as a thin layer of a uniform thickness.

In such an image-forming apparatus, the development roll 2 is rotatably arranged, and there is provided a development device comprising a developer container 5 in which the toner 4 is contained. The toner is stirred by a stirring rod 14 and uniformly dispersed. The surface of the photosensitive member 1 is charged with electricity by a charger wire 9. The charged photosensitive member 1 is exposed to a photo-signal or photo-image 10 from a exposing means, thereby forming an electrostatic latent image on the surface thereof. A part of the toner coated on the peripheral surface of the development roll 2 is selectively transferred to the photosensitive member 1 in a fixed pattern corresponding to the electrostatic latent image formed on the photosensitive member 1, thereby forming a visible image (toner image) on the photosensitive member 1. The thus-formed visible image is transferred to a transfer material 13 such as transfer paper by the action of a charger wire 11 for transfer, and fixed thereto by a method such as heat fusion bonding by fixing rolls 12.

The roll-like base (core bar) of the development roll 2 may preferably be constructed so as to apply bias voltage thereto. In the case of reversal development, bias voltage having the same polarity as that of the electrostatic latent image formed on the photosensitive member is applied. The photosensitive member 1 is generally formed in the form of a drum. The transfer material 13 is paper or OHP sheet by way of example. After the transfer step, the toner remaining on the photosensitive member 1 is removed by a cleaning blade 7 and collected into a waste toner box 8.

In the image-forming apparatus illustrated in FIG. 2, a charging roll 16 and a photosensitive member 1 are arranged in contact with each other so as to apply voltage to the photosensitive member 1 through a core bar 17 of the charging roll from a power supply 18, thereby charging the surface of the photosensitive member 1 with electricity. The photosensitive member 1 is exposed by an exposing means 15 making use of a laser as a light source, thereby forming an electrostatic latent image on the surface of the charged photosensitive member 1. This electrostatic latent image is developed into a visible image with a toner coated on a development roll 2. This visible image is transferred to a transfer material 13 using a transfer roll 19. Voltage having a polarity opposite to the toner is applied to the transfer roll 19 through a core bar 20 of the transfer roll 19 from a power supply 21 so as to generate an electric field between the transfer roll 19 and the photosensitive member 1. The toner on the photosensitive member 1 is transferred to the transfer material 13 by the electrostatic force of this electric field. After the transfer step, the toner remaining on the photosensitive member 1 may be removed by means of a cleaning device. However, the image-forming apparatus illustrated in FIG. 2 is an apparatus of so-called cleanerless system. In the cleanerless system, after the charging step, the toner remaining on the photosensitive member 1 is attracted to a development device by electrostatic force generated by a difference between the surface potential of the charged photosensitive member 1 and a developing bias. The development roll 2 is so constructed that the bias voltage is applied to the development roll 2 through its core bar.

The image-forming apparatus according to the present invention may preferably include, around a photosensitive member, a charging device for equally and uniformly charging the photosensitive member with electricity, an exposing device (latent image-forming device) consisting of a laser of the like for writing an electrostatic latent image on the surface of the photosensitive member uniformly charged, the above-described development device and a transfer device for transferring the visible image developed to transfer paper or the like. A cleaning device for removing an excess developer adhered to the surface of the photosensitive member may be arranged between the transfer device and the charging device. The cleaning device is generally constructed by a blade or roll. In the case where cleaning is carried out at the same time as the development, this cleaning device is not always required.

Developer

No particular limitation is imposed on the developer usable in the image-forming apparatus according to the present invention. However, a non-magnetic one-component developer is generally used. A developer as described below is particularly preferred.

Namely, a preferred developer usable in the image-forming apparatus according to the present invention is a spherical non-magnetic, one-component developer having physical properties that the volume-average particle diameter (dv) is within a range of generally from 3 to 15 μm, preferably from 5 to 10 μm, and the ratio (dv/dn) of the volume-average particle diameter (dv) to the number-average particle diameter (dn) is within a range of generally from 1.0 to 1.4. It is more preferable that this developer should have physical properties that a quotient (Sc/Sr) obtained by dividing the area (Sc) of a circle supposing the absolute maximum length of a particle is a diameter, by the real projected area (Sr) of the particle is within a range of generally from 1.0 to 1.3, and a product (A×dn×D) of the specific surface area (A) [m$^2$/g] as measured in accordance with the BET method, the number-average particle diameter (dn) [μm] and the true specific gravity (D) is within a range of from 5 to 10, and hence be substantially spherical. It is further preferable that the developer should have a physical property that the ratio (Q/A) of the charge level (Q) [μc/g] to the specific surface area (A) is within a range of from 80 to 150. Examples of the spherical developer include capsule type toners comprising a core composed of a soft resin and a shell composed of a hard resin, and colored toners.

Such a spherical non-magnetic one-component developer can be prepared, for example, by polymerizing an intimate mixture containing at least one vinyl monomer and at least one colorant by a suspension polymerization process. As an exemplary specific suspension polymerization process, may be mentioned a process in which a mixture comprising a vinyl monomer, a colorant and a polymerization initiator, and as optional components, various kinds of additives is intimately dispersed by a ball mill or the like to prepare an intimate liquid mixture, and the thus-obtained intimate liquid mixture is then finely dispersed as droplets in water under high-shear stirring to prepare an aqueous dispersion, thereby subjecting the dispersion to suspension polymerization at a temperature of 30°–200° C. in general.

It is also possible to simultaneously contain or subsequently add, into the non-magnetic one-component developer, additives for controlling charge characteristics, electric conductivity, flowability, or adhesion properties to the photosensitive member or fixing roll. Such additives include, for example, releasing agents such as low-molecular weight polypropylene, low-molecular weight polyethylene, various kinds of waxes and silicone oils; and inorganic fine powders such as carbon black powder, silica powder, alumina powder, titanium oxide powder, zinc oxide powder, cerium oxide powder and calcium carbonate powder.

ADVANTAGES OF THE INVENTION

According to the present invention, there are provided rubber covered rolls which do not contaminate any photosensitive member, stably have a low electric resistance, and are low in dependence of electric resistance on environment and in hardness. According to the present invention, there are also provided rubber compositions suitable for use in forming a surface layer for such a rubber covered roll. The rubber covered rolls according to the present invention can be suitably used as development rolls and/or charging rolls in image-forming apparatus applied to a non-magnetic one-component development process. In the rubber covered rolls according to the present invention, a rubber composition forming a rubber layer is vulcanized with a sulfur type vulcanizing agent or a peroxide in particular. Therefore, the surface treatment of the rubber composition after its molding into a rubber covered roll can effectively prevent any OPC photosensitive member from being contaminated. The rubber compositions according to the present invention are excellent in processability and hence can also contribute to improvement in productivity and energy saving.

EMBODIMENT OF THE INVENTION

The present invention will hereinafter be described more specifically by the following Examples and Comparative Examples. However, this invention is not limited to these examples only. Incidentally, properties as to electric resistance, moisture absorption (hygroscopicity), hardness, contamination of OPC photosensitive member, image properties (image density, fog, contamination of OPC photosensitive member) and the like were determined in accordance with the following respective methods.

<Electric resistance>

A rubber sheet 2 mm thick was held between electrodes equipped with a guide ring, and d.c. voltage of 500 V was applied to the sheet, thereby measuring its electric resistance. The measurement was performed under two environmental conditions of LL conditions (10° C., 20% RH) of low temperature and low humidity, and HH conditions (35° C., 80% RH) of high temperature and high humidity. It is preferable that a difference in electric resistance between under LL conditions and under HH conditions be within 1 order because the dependence of electric resistance on environment is concluded to be low.

<Moisture absorption>

A strip 20 mm wide by 50 mm long was punched out of a rubber sheet 2 mm thick and precisely weighed in the balance to 0.1 mg. Thereafter, the strip was left over for 72 hours in an environment of 35° C. and 80% RH and then weighed again. An increment was divided by the original weight, and the quotient was multiplied by 100. The thus-obtained percent increase (%) was used as a measure of the hygroscopicity. It is better for the hygroscopicity to be lower.

<Hardness>

The hardness was measured in accordance with the provisions of JIS K-6253.

<Contamination of OPC photosensitive member>

A strip 20 mm wide by 50 mm long was punched out of a rubber sheet 2 mm thick, attached to a commercially-available OPC photosensitive member and then left over for 3 weeks in an environment of 50° C. and 80% RH, thereby evaluating the rubber sheet as to whether the OPC photosensitive member was contaminated or not in accordance with the following three ranks:

AA: No contamination was observed upon elapsed time of 3 weeks;

A: No contamination was observed upon elapsed time of 2 weeks; and

C: Contamination was observed before elapsed time of 2 weeks;

<Image properties>

Continuous printing was conducted by means of the image-forming apparatus illustrated in FIG. 1 to visually observe the image density, degree of fog on the photosensitive member and contamination of the OPC photosensitive member (caused by the formation of a film of the developer due to adhesion of the developer in the cleaning blade), thereby conducting evaluation.

(1) Image density

The evaluation of the image density (ID) was performed by measuring the density of "a black solid area" by a "Macbeth" reflection densitometer.

The image properties were evaluated in accordance with the following two ranks:

A: Image density was high even when conducting continuous printing of 20,000 sheets (image density was not lower than 1.3); and C: Image was blurred when conducting continuous printing of 20,000 sheets, and image density became low (image density was lower than 1.3).

(2) Degree of fog on the photosensitive member

The degree of fog was evaluated in accordance with the following four ranks:

AA: No fog occurred even when conducting continuous printing of 30,000 sheets;

A: No fog occurred even when conducting continuous printing of 20,000 sheets;

B: Fog occurred when conducting continuous printing of 20,000 sheets, but it was inconspicuous; and C: Fog considerably occurred when conducting continuous printing of 20,000 sheets, and it was conspicuous.

(3) Compressive resistance

A rubber covered roll was pressed against a commercially-available OPC photosensitive member and then left over for 3 weeks in an environment of 50° C. and 80% RH, thereby observing whether the deformation of the roll by the pressing was recovered or not after releasing the pressing and evaluating as to the compressive resistance in accordance with the following three ranks:

AA: The roll recovered to the original form even upon elapsed time of 3 weeks;

A: The roll recovered to the original form upon elapsed time of 2 weeks; and

C: The roll was difficult to recover to the original form before elapsed time of 2 weeks.

(4) Contamination of OPC photosensitive member

AA: There was no influence by contamination of the OPC photosensitive member even when conducting printing of 30,000 sheets;

A: There was no influence by contamination of the OPC photosensitive member even when conducting printing of 20,000 sheets; and C: White stripes due to contamination of the OPC photosensitive member occurred in the course of printing of 20,000 sheets.

[EXAMPLES 1–9 AND COMPARATIVE EXAMPLES 1–9]

Ethylene oxide, propylene oxide, epichlorohydrin and allyl glycidyl ether were polymerized with an organic aluminum compound catalyst in accordance with a solution polymerization process known per se in the art, thereby preparing copolymer rubbers having their corresponding copolymer compositions shown in Tables 1 and 2.

To these copolymer rubbers, were added their corresponding unsaturated rubbers shown in Tables 1 and 2, and calcium carbonate was added to these rubber components in a proportion of 20 parts by weight per 100 parts by weight of the rubber component. Further, their corresponding vulcanizing systems and other additives shown in Tables 1 and 2 were added to prepare rubber compositions.

The compositions of the copolymer rubbers and compounding proportions of the individual ingredients are shown in Tables 1 and 2. In Tables 1 and 2, the compositions of the copolymer rubbers are expressed by mol % of the individual comonomers, and the blending ratios of the copolymer rubber to the unsaturated rubber are expressed by wt. % of the individual rubber components, and the compounding proportions of the vulcanizing systems and other additives are expressed by parts by weight per 100 parts by weight of the rubber component.

The rubber compositions obtained in the above examples and comparative examples were separately kneaded in a roll mill to form them into sheets. The thus-formed sheets were vulcanized at 150° C. for 30 minutes, thereby obtaining vulcanized rubber sheets 2 mm thick. The electric resistance, moisture absorption (hygroscopicity), hardness, contamination of OPC photosensitive member and compressive resistance of each of the vulcanized rubber sheets thus obtained were evaluated in accordance with the above-described respective methods. The measurement results of the kneading time on the respective rubber compositions are also shown collectively. The results are shown in Tables 1 and 2.

(*6) SBR

Styrene-butadiene copolymer rubber, trade name "Nipol 1500", product of Nippon Zeon Co., Ltd.

(*7) Antioxidant 224

TABLE 1

| | Example | | | | | | | | |
|---|---|---|---|---|---|---|---|---|---|
| | 1 | 2 | 3 | 4 | 5 | 6 | 7 | 8 | 9 |
| Copolymer rubber: (parts by weight) <Monomer composition, mol %> | 75 | 75 | 70 | 75 | 75 | 80 | 75 | 75 | 75 |
| Ethylene oxide | 46 | 46 | 46 | 46 | 46 | 46 | 31 | 56 | — |
| Propylene oxide | 10 | 10 | 10 | 10 | 10 | 10 | 25 | — | 56 |
| Epichlorohydrin | 40 | 40 | 40 | 40 | 40 | 40 | 40 | 40 | 40 |
| Allyl glycidyl ether | 4 | 4 | 4 | 4 | 4 | 4 | 4 | 4 | 4 |
| Unsaturated rubber (parts by weight): | | | | | | | | | |
| NBR (*1) | 25 | — | — | — | — | — | 25 | 25 | — |
| Hydrogenated NBR (*2) | — | 25 | — | — | — | — | — | — | — |
| EPDM (*3) | — | — | 30 | — | — | — | — | — | — |
| Chloroprene rubber (*4) | — | — | — | 25 | — | — | — | — | — |
| NBIR (*5) | — | — | — | — | 25 | — | — | — | 25 |
| SBR (*6) | — | — | — | — | — | 20 | — | — | — |
| Vulcanizing agent (parts by weight): | | | | | | | | | |
| Sulfur | 1.5 | 1.5 | 1.5 | 1.5 | 1.5 | 1.5 | 1.5 | 1.5 | 1.5 |
| Vulcanization accelerator (parts by weight): | | | | | | | | | |
| tetramethylthiuram disulfide | 1.5 | 1.5 | 1.5 | 1.5 | 1.5 | 1.5 | 1.5 | 1.5 | 1.5 |
| Other additives (parts by weight): | | | | | | | | | |
| Stearic acid | 1 | 1 | 1 | 1 | 1 | 1 | 1 | 1 | 1 |
| Zinc oxide | 5 | 5 | 5 | 5 | 5 | 5 | 5 | 5 | 5 |
| Calcium carbonate | 20 | 20 | 20 | 20 | 20 | 20 | 20 | 20 | 20 |
| Antioxidant 224 (*7) | 1 | 1 | 1 | 1 | 1 | 1 | 1 | 1 | 1 |
| Kneading time (min) | 30 | 35 | 30 | 30 | 30 | 30 | 30 | 35 | 30 |
| Evaluation of sheet: | | | | | | | | | |
| Electric resistance LL ($\Omega \cdot cm$) | $5 \times 10^7$ | $2 \times 10^8$ | $3 \times 10^7$ | $5 \times 10^7$ | $5 \times 10^7$ | $4 \times 10^7$ | $3 \times 10^8$ | $8 \times 10^6$ | $2 \times 10^7$ |
| Electric resistance HH ($\Omega \cdot cm$) | $9 \times 10^6$ | $8 \times 10^7$ | $8 \times 10^6$ | $9 \times 10^6$ | $8 \times 10^6$ | $6 \times 10^6$ | $6 \times 10^7$ | $2 \times 10^6$ | $6 \times 10^6$ |
| Hygroscopicity (%) | 0.2 | 0.3 | 0.3 | 0.2 | 0.3 | 0.2 | 0.2 | 0.5 | 0.4 |
| Hardness (type duro A) (degree) | 45 | 48 | 43 | 46 | 45 | 46 | 48 | 43 | 46 |
| Contamination of photosensitive member | A | A | A | A | A | A | A | A | A |

(*1) NBR

Acrylonitrile-butadiene copolymer rubber having an acrylonitrile content of 33 wt. % and an iodine value of 280.

(*2) Hydrogenated NBR

Hydrogenated acrylonitrile-butadiene copolymer rubber having an acrylonitrile content of 36 wt. % and an iodine value of 28.

(*3) EPDM

Ethylene-propylene-cyclopendadiene copolymer rubber, trade name "EPDM 1035", product of Mitsui Petrochemical Industries, Ltd.

(*4) Chloroprene rubber

Trade name "Chloroprene PS-40", product of Denki Kagaku Kogyo Kabushiki Kaisha.

(*5) NBIR

Acrylonitrile-butadiene-isoprene copolymer rubber, trade name "DN 1201, product of Nippon Zeon Co., Ltd.

Polymerized trimethyl dihydro quinoline, product of Ouchi-Shinko Chemical Industrial Co., Ltd.

TABLE 2

| | Comparative Example | | | | | | | | |
|---|---|---|---|---|---|---|---|---|---|
| | 1 | 2 | 3 | 4 | 5 | 6 | 7 | 8 | 9 |
| Copolymer rubber: (parts by weight) <Monomer composition, mol %> | 75 | 75 | 75 | 75 | 75 | 75 | 75 | 75 | 100 |
| Ethylene oxide | 21 | 76 | 26 | 40 | 32 | 46 | 46 | 46 | 46 |
| Propylene oxide | — | — | 46 | — | — | 10 | 10 | 10 | 10 |
| Epichlorohydrin | 75 | 20 | 24 | 60 | 51 | 40 | 40 | 40 | 40 |
| Allyl glycidyl ether | 4 | 4 | 4 | — | 17 | 4 | 4 | 4 | 4 |
| Unsaturated rubber (parts by weight): | | | | | | | | | |
| NBR (*1) | 25 | — | — | — | — | — | — | — | — |
| Hydrogenated NBR (*2) | — | 25 | — | — | — | — | — | — | — |
| EPDM (*3) | — | — | 25 | — | — | — | 25 | — | — |
| Chloroprene rubber (*4) | — | — | — | 25 | — | — | — | — | — |
| NBIR (*5) | — | — | — | — | 25 | — | — | 25 | — |
| SBR (*6) | — | — | — | — | — | 25 | — | — | — |
| Vulcanizing agent (parts by weight): | | | | | | | | | |
| Sulfur | 1.5 | 1.5 | 1.5 | 1.5 | 1.5 | — | — | — | 1.5 |
| 2-Mercaptoimidazoline | — | — | — | — | — | 3.0 | — | — | — |
| Diethylurea | — | — | — | — | — | — | 3.0 | — | — |
| Triethylenetetramine | — | — | — | — | — | — | — | 2.0 | — |
| Vulcanization accelerator (parts by weight): | | | | | | | | | |
| tetramethylthiuram disulfide | 1.5 | 1.5 | 1.5 | 1.5 | 1.5 | — | — | — | 1.5 |
| Benzothiazyl disulfide | — | — | — | — | — | 3.0 | — | — | — |
| Other additives (parts by weight): | | | | | | | | | |
| Zinc stearate | — | — | — | — | — | 1 | 1 | 1 | — |
| Stearic acid | 1 | 1 | 1 | 1 | 1 | — | — | — | — |
| Red lead | — | — | — | — | — | 5 | 5 | 5 | — |
| Zinc oxide | 5 | 5 | 5 | 5 | 5 | — | — | — | 5 |
| Calcium carbonate | 20 | 20 | 20 | 20 | 20 | 20 | 20 | 20 | 20 |
| Antioxidant NBC (*8) | — | — | — | — | — | 1 | 1 | 1 | — |
| Antioxidant 224 (*7) | 1 | 1 | 1 | 1 | 1 | — | — | — | 1 |
| Kneading time (min) | 30 | 35 | 30 | 30 | 30 | 30 | 30 | 35 | 70 |
| Evaluation of sheet: | | | | | | | | | |
| Electric resistance LL ($\Omega \cdot cm$) | $2 \times 10^9$ | $8 \times 10^7$ | $3 \times 10^8$ | — | — | $3 \times 10^7$ | $5 \times 10^8$ | $6 \times 10^7$ | $5 \times 10^7$ |
| Electric resistance HH ($\Omega \cdot cm$) | $8 \times 10^7$ | $2 \times 10^5$ | $1 \times 10^6$ | — | — | $4 \times 10^6$ | $9 \times 10^7$ | $8 \times 10^6$ | $9 \times 10^5$ |
| Hygroscopicity (%) | 0.2 | 0.9 | 0.3 | — | — | 0.2 | 0.2 | 0.3 | 0.2 |
| Hardness (type duro A) (degree) | 75 | 38 | 50 | — | — | 48 | 45 | 44 | 45 |
| Contamination of photosensitive member | — | — | — | — | — | C | C | C | A |

(*1) to (*7) have the same meaning as in Table 1. (*8) Antioxidant NBC

Nickel dibutyldithiocarbamate, product of Sumitomo Chemical Co., Ltd.

The respective vulcanized rubber sheets obtained by using the rubber compositions of Examples 1–9 varied only within 1 order in electric resistance between under the LL conditions and under the HH conditions and each had a moderate electric resistance. It may also safely be said that they are low in dependence of electric resistance on environment. These vulcanized rubber sheets were all low in hygroscopicity and also had moderate hardness. Further, these vulcanized rubber sheets were not particularly observed to contaminate the OPC photosensitive member. In addition, the rubber compositions of Examples 1–9 were excellent in processability as demonstrated by the fact that the kneading time, for which a rubber composition is sufficiently kneaded to permit the formation of a sheet, was as short as 30–35 minutes. In the rubber compositions of Examples 1–9, it is understood that when ethylene oxide and propylene oxide are used in combination in the copolymer rubber (A), the rubber compositions can be provided as compositions better in the various properties.

On the other hand, in the cases where the compositions of the copolymer rubbers are outside the compositional range of the copolymer rubber (A) in the present invention (Comparative Examples 1–8) and where the rubber composition contains no unsaturated rubber (B) (Comparative Example 9), the results, which will be described in detail subsequently, revealed that they are unfit for practical use as development rolls.

In the sheet of Comparative Example 1 in which the copolymer rubber of a composition that epichlorohydrin was contained in an amount more than 70 mol % was used, the electric resistance and the dependence of electric resistance on environment were high, and more over the hardness was also high. In Comparative Example 2 in which the copolymer rubber of a composition that ethylene oxide was contained in an amount more than 70 mol % was used, the dependence of electric resistance on environment, and the hygroscopicity were high. In Comparative Example 3 in which the copolymer rubber of a composition that alkylene oxide comonomers were contained in an amount more than 70 mol % was used, electric resistance values greatly differed between under the LL conditions and under the HH conditions. In Comparative Example 4 in which the copolymer rubber of a composition that no allyl glycidyl ether was contained was used, no plain vulcanized rubber sheet was obtained. In Comparative Example 5 in which the copolymer rubber of a composition that 17 mol % of allyl glycidyl ether was contained was used, no plain rubber sheet was also obtained. Therefore, the evaluation of the properties was not performed in Comparative Examples 4 and 5. In Comparative Examples 6–8 in which the vulcanizing system was a thiourea or amine system, the contamination of the OPC photosensitive member with the vulcanized rubber sheet was observed. In Comparative Example 9 in which no saturated rubber (B) was added, the rubber composition was poor in processability as demonstrated by the fact that the kneading time, for which a rubber composition is sufficiently kneaded to permit the formation of a sheet, was as long as 70 minutes.

[EXAMPLE 10]

Various surface treatment experiments were performed with the vulcanized rubber sheets formed from the rubber composition of Example 2.

After the vulcanized rubber sheet was polished by a grinder to a surface roughness of at most 20 μm, the vulcanized rubber sheet thus polished was exposed to ultraviolet rays for 2 minutes from an ultraviolet lamp (wavelength: about 280 nm) having a lamp output of 80 W/cm and a rated power of 4 kW, 12 cm distant from the sheet.

A mold for a roll, in which a core bar had been placed in advance, was charged with the rubber composition of Example 2 to vulcanize the rubber composition at 155° C. for 30 minutes, thereby obtaining a rubber covered roll. After the surface of this rubber covered roll was polished to a surface roughness of at most 20 μm, the rubber covered roll thus polished was exposed to ultraviolet rays for 2 minutes from the ultraviolet lamp (wavelength: about 280 nm) having a lamp output of 80 W/cm and a rated power of 4 kW, 12 cm distant from the rubber covered roll. The ultraviolet-light irradiation was carried out while rotating the rubber covered roll around the lamp.

After the ultraviolet-light irradiation, a development roll in the image-forming apparatus applied to the non-magnetic one-component development process was replaced with the thus-treated rubber covered roll, thereby evaluating the roll as to image properties (image density, degree of fog on the photosensitive member, contamination of OPC photosensitive member) and the like with a substantially spherical, non-magnetic one-component developer having physical properties that the volume-average particle diameter (dv) was 7 μm, the ratio (dv/dn) of the volume-average particle diameter (dv) to the number-average particle diameter (dn) was 1.1, a quotient (Sc/Sr) obtained by dividing the area (Sc) of a circle supposing the absolute maximum length of a particle is a diameter, by the real projected area (Sr) of the particle was 1.08, a product (A×dn×D) of the specific surface area (A) [m$^2$/g] as measured in accordance with the BET method, the number-average particle diameter (dn) [μm] and the true specific gravity (D) was 7, and the ratio (Q/A) of the charge level (Q) [μc/g] to the specific surface area (A) was 105. The results are shown in Table 3.

[EXAMPLE 11]

A rubber sheet and a conductive roll were obtained in the same manner as in Example 10 except that the ultraviolet-light irradiation treatment in Example 10 was changed to the following ozone exposure treatment. Ozone exposure treatment: The vulcanized rubber sheet was left over for 1 hour in an atmosphere containing ozone in a concentration of about 20 pphm (×10$^{-8}$) at a temperature of 40° C.

[EXAMPLE 12]

A rubber sheet and a conductive roll were obtained in the same manner as in Example 10 except that the ultraviolet-light irradiation treatment in Example 10 was changed to the following application of a reactive silicone compound.

Application of the reactive silicone compound: A 10% ethyl acetate solution of a silicone compound, in which an isocyanate had been introduced, was coated on the surface of the vulcanized rubber sheet, and the rubber sheet was air-dried and then subjected to a heat treatment at 100° C. for 1 hour.

[EXAMPLE 13]

A rubber sheet and a conductive roll were obtained in the same manner as in Example 10 except that the ultraviolet-light irradiation treatment in Example 10 was changed to the following application of a reactive fluorine compound.

Application of the reactive fluorine compound: A 10% ethyl acetate solution of a fluorine compound, in which an isocyanate had been introduced, was coated on the surface of the vulcanized rubber sheet, and the rubber sheet was air-dried and then subjected to a heat treatment at 100° C. for 1 hour.

The vulcanized rubber sheets subjected to the respective surface treatments were separately attached to the surface of an OPC photosensitive member to evaluate them as to the tendency to contaminate the photosensitive member. As a result, in the case where an untreated vulcanized rubber sheet was used, the surface contamination of the OPC photosensitive member was slightly observed on the 18th day. In each case where the vulcanized rubber sheets subjected to the respective surface treatments were separately used, no surface contamination of the OPC photosensitive member was observed even upon elapsed time of 3 weeks after the attachment. According to both untreated rubber covered roll and the treated rubber covered rolls, the image density at the beginning of the printing was kept even after conducting printing of 20,000 sheets (image density: A), and fog was scarcely observed (degree of fog on the photosensitive member: A). In addition, even when the untreated rubber covered roll was used, the surface contamination of the OPC photosensitive member was scarcely observed (contamination of the OPC photosensitive member: A). When the rubber covered rolls subjected to the surface treatments were separately used, no surface contamination was observed in all the cases (contamination of the OPC photosensitive member: A).

[EXAMPLES 14–18]

Rubber sheets and conductive rolls were obtained in the same manner as in Example 10 except that the rubber composition used in Example 10 was changed to rubber compositions of their corresponding formulations shown in Table 3. The results of their evaluation are shown in Table 3.

TABLE 3

| | Example | | | | | | | | |
|---|---|---|---|---|---|---|---|---|---|
| | 10 | 11 | 12 | 13 | 14 | 15 | 16 | 17 | 18 |
| Copolymer rubber: (parts by weight) <Monomer composition, mol %> | 75 | 75 | 75 | 75 | 65 | 50 | 35 | 75 | 75 |
| Ethylene oxide | 46 | 46 | 46 | 46 | 46 | 31 | 46 | 10 | 10 |
| Propylene oxide | 10 | 10 | 10 | 10 | 10 | 15 | 10 | 46 | 42 |
| Epichlorohydrin | 40 | 40 | 40 | 40 | 40 | 50 | 40 | 40 | 40 |
| Allyl glycidyl ether | 4 | 4 | 4 | 4 | 4 | 4 | 4 | 4 | 8 |
| Unsaturated rubber (parts by weight): | | | | | | | | | |
| NBR (*1) | — | — | — | — | 35 | — | 65 | 25 | 25 |
| Hydrogenated NBR (*2) | 25 | 25 | 25 | 25 | — | 50 | — | — | — |
| Vulcanizing agent (parts by weight): | | | | | | | | | |
| Sulfur | 1.5 | 1.5 | 1.5 | 1.5 | — | — | — | — | — |
| DCP (*9) | — | — | — | — | 0.5 | 0.5 | 0.5 | — | — |
| BPIB (*10) | — | — | — | — | — | — | — | 1.0 | — |
| BPMA (*11) | — | — | — | — | — | — | — | — | 1.0 |
| Vulcanization accelerator (parts by weight): | | | | | | | | | |
| tetramethylthiuram disulfide | 1.5 | 1.5 | 1.5 | 1.5 | 1.0 | 1.0 | 1.0 | — | — |
| Phenylbismaleimide | — | — | — | — | — | — | — | — | 1.0 |
| Other additives (parts by weight): | | | | | | | | | |
| Stearic acid | 1 | 1 | 1 | 1 | 1 | 1 | 1 | 1 | 1 |
| Zinc oxide | 5 | 5 | 5 | 5 | 5 | 5 | 5 | 5 | 5 |
| Calcium carbonate | 20 | 20 | 20 | 20 | 20 | 20 | 20 | 20 | 20 |
| Antioxidant 224 (*7) | 1 | 1 | 1 | 1 | 1 | 1 | 1 | 1 | 1 |
| Kneading time (min) | 35 | 35 | 35 | 35 | 35 | 30 | 30 | 30 | 30 |
| Evaluation of sheet: | | | | | | | | | |
| Electric resistance LL ($\Omega \cdot cm$) | $3 \times 10^8$ | $4 \times 10^8$ | $3 \times 10^9$ | $3 \times 10^9$ | $3 \times 10^8$ | $5 \times 10^8$ | $5 \times 10^9$ | $5 \times 10^7$ | $7 \times 10^9$ |
| Electric resistance HH ($\Omega \cdot cm$) | $9 \times 10^7$ | $9 \times 10^7$ | $8 \times 10^8$ | $7 \times 10^8$ | $5 \times 10^7$ | $7 \times 10^7$ | $8 \times 10^8$ | $8 \times 10^6$ | $9 \times 10^8$ |
| Hygroscopicity (%) | 0.3 | 0.3 | 0.1 | 0.2 | 0.2 | 0.2 | 0.1 | 0.2 | 0.3 |
| Hardness (type duro A) (degree) | 49 | 49 | 50 | 50 | 46 | 46 | 45 | 45 | 45 |
| Contamination of photosensitive member | AA | AA | AA | AA | AA | AA | AA | AA | AA |
| Evaluation of image: | | | | | | | | | |
| Image density | A | A | A | A | A | A | A | A | A |
| Fog | A | A | A | A | AA | AA | AA | AA | AA |
| Compressive resistance | AA | A | A | A | A | AA | AA | AA | AA |
| Contamination of photosensitive member with roll | A | A | A | A | AA | AA | AA | AA | AA |

(*1), (*2) and (*7) have the same meaning as described above.

(*9) Dicumyl peroxide.

(*10) Di(t-butylperoxy)diisopropylbenzene.

(*11) 2,5-Di-t-butylperoxy-2,5-dimethylhexane.

From the above results, it is understood that the development roll consisting of each of the rubber covered rolls according to the present invention does not contaminate any photosensitive member, stably has a low electric resistance, and is low in dependence of electric resistance on environment and in hardness.

We claim:

1. A rubber covered roll arranged in contact with a photosensitive member in an image-forming apparatus in which an electrostatic latent image on the photosensitive member is developed into a visible image with a developer, wherein (1) the rubber covered roll comprises a rubber layer formed on the surface of a roll base, and (2) the rubber layer is formed of a vulcanizate obtained by vulcanizing, with a vulcanizing agent consisting of a sulfur based vulcanizing agent or a peroxide, a rubber composition comprising 25–95 wt. % of copolymer rubber (A) obtained by copolymerizing 28–70 mol % of an alkylene oxide, 28–70 mol % of an epihalohydrin and 2–15 mol % of an ethylenically unsaturated epoxide, all based on the total mol of the monomers, and 5–75 wt. % of unsaturated rubber (B).

2. The rubber covered roll according to claim 1, wherein the epihalohydrin is epichlorohydrin.

3. The rubber covered roll according to claim 1, wherein the ethylenically unsaturated epoxide is at least one selected from the group consisting of allyl glycidyl ether, glycidyl methacrylate, glycidyl acrylate and butadiene monoxide.

4. The rubber covered roll according to claim 1, wherein the copolymer rubber (A) is obtained by copolymerizing 28–70 mol % of at least one alkylene oxide selected from the group consisting of ethylene oxide and propylene oxide, 28–70 mol % of epichlorohydrin and 2–15 mol % of an ethylenically unsaturated epoxide selected from the group consisting of allyl glycidyl ether, glycidyl methacrylate, glycidyl acrylate and butadiene monoxide, all based on the total mol of the monomers.

5. The rubber covered roll according to claim 1, wherein the unsaturated rubber (B) has an iodine value of 3–500.

6. The rubber covered roll according to claim 1, wherein the unsaturated rubber (B) is at least one unsaturated rubber selected from the group consisting of acrylonitrile-butadiene copolymer rubber, ethylene-propylene-diene terpolymer rubber, chloroprene rubber, acrylonitrile-isoprene copolymer rubber, acrylonitrile-butadiene-isoprene terpolymer rubber, styrene-butadiene copolymer rubber, butadiene rubber, isoprene rubber and partially hydrogenated products of these rubbers.

7. The rubber covered roll according to claim 1, wherein the unsaturated rubber (B) is acrylonitrile-butadiene copolymer rubber or a partially hydrogenated product thereof.

8. The rubber covered roll according to claim 1, wherein the rubber layer has been subjected to a surface treatment by ultraviolet-light irradiation, exposure to ozone, application of a reactive silicone compound or application of a reactive fluorine compound.

9. The rubber covered roll according to claim 8, wherein the rubber layer has been subjected to the surface treatment after polishing the surface thereof.

10. The rubber covered roll according to claim 1, which is a development roll.

11. The rubber covered roll according to claim 1, which is a charging roll.

12. The rubber covered roll according to claim 1, wherein the electric resistance of the rubber layer is within a range of $5 \times 10^6$ to $1 \times 10^{10}$ $\Omega$.cm as measured at 10° C. and 20% relative humidity.

13. The rubber covered roll according to claim 1, wherein the ratio (a/b) of an electric resistance (a) of the rubber layer measured at 10° C. and 20% relative humidity to an electric resistance (b) of the rubber layer as measured at 35° C. and 80% relative humidity is within a range of 0.1–10.

14. The rubber covered roll according to claim 1, wherein the vulcanizing agent is selected from the group consisting of sulfur, morpholine disulfide, thiurams, dicumyl peroxide, di-(t-butylperoxy)diisopropylbenzene, 2,5-di-t-butylperoxy-2,5-dimethylhexane and benzoyl peroxide.

15. An image-forming apparatus comprising a photosensitive member and a development roll arranged in contact with each other, wherein an electrostatic latent image formed on the photosensitive member is developed into a visible image with a non-magnetic one-component developer uniformly coated on the surface of the development roll, and further wherein (1) the development roll comprises a rubber covered roll obtained by forming, on the surface of a roll base, a rubber layer formed of a vulcanizate obtained by vulcanizing, with a vulcanizing agent consisting of a sulfur based vulcanizing agent or a peroxide, a rubber composition comprising 25–95 wt. % of copolymer rubber (A) obtained by copolymerizing 28–70 mol % of an alkylene oxide, 28–70 mol % of an epihalohydrin and 2–15 mol % of an ethylenically unsaturated epoxide, all based on the total mol of the monomers, and 5–75 wt. % of unsaturated rubber (B).

16. The image-forming apparatus according to claim 15, further comprising a charging roll arranged in contact with the photosensitive member together with the development roll, wherein the changing roll comprises a rubber covered roll obtained by forming, on the surface of a roll base, a rubber layer formed from a vulcanizate obtained by vulcanizing, with a vulcanizing agent consisting of a sulfur based vulcanizing agent or a peroxide, a rubber composition comprising 25–95 wt. % of copolymer rubber (A) obtained by copolymerizing 28–70 mol % of an alkylene oxide, 28–70 mol % of an epihalohydrin and 2–15 mol % of an ethylenically unsaturated epoxide, all based on the total mol of the monomers, and 5–75 wt. % of unsaturated rubber (B).

17. A rubber composition for rubber covered rolls arranged in contact with a photosensitive member in an image-forming apparatus in which an electrostatic latent image on the photosensitive member is developed into a visible image with a developer, comprising 100 parts by weight of a rubber component containing 25–95 wt. % of copolymer rubber (A) obtained by copolymerizing 28–70 mol % of an alkylene oxide, 28–70 mol % of an epihalohydrin and 2–15 mol % of an ethylenically unsaturated epoxide, all based on the total mol of the monomers, 5–75 wt. % of unsaturated rubber (B), and 0.1–5 parts by weight of a vulcanizing agent consisting of a sulfur based vulcanizing agent or a peroxide.

18. The rubber composition according to claim 17, wherein the vulcanizing agent is selected from the group consisting of sulfur, morpholine disulfide, thiurams, dicumyl peroxide, di-(t-butylperoxy)diisopropylbenzene, 2,5-di-t-butylperoxy-2,5-dimethylhexane and benzoyl peroxide.

* * * * *

UNITED STATES PATENT AND TRADEMARK OFFICE
CERTIFICATE OF CORRECTION

PATENT NO. : 5,733,235
DATED : March 31, 1998
INVENTOR(S) : Tetsuo Waku et al

It is certified that error appears in the above-identified patent and that said Letters Patent is hereby corrected as shown below:

Claim 16, column 22, line 26, change "changing" to --charging--;

Claim 17, column 22, line 45, after "monomers," insert --and--.

Signed and Sealed this

Ninth Day of June, 1998

Attest:

BRUCE LEHMAN

Attesting Officer

Commissioner of Patents and Trademarks